United States Patent
Alla et al.

(10) Patent No.: US 9,275,429 B2
(45) Date of Patent: Mar. 1, 2016

(54) DEVICE HANG DETECTION AND RECOVERY

(71) Applicant: QUALCOMM Incorporated, San Diego, CA (US)

(72) Inventors: Srihari Babu Alla, San Diego, CA (US); Tarun Reddy Karra, San Diego, CA (US); Jonathan Gerald Thomason, San Diego, CA (US); Colin Christopher Sharp, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/182,171

(22) Filed: Feb. 17, 2014

(65) Prior Publication Data
US 2015/0235338 A1 Aug. 20, 2015

(51) Int. Cl.
*G06T 1/00* (2006.01)
*G06T 15/00* (2011.01)
*G06F 15/00* (2006.01)
*G06T 1/20* (2006.01)
*G06F 9/445* (2006.01)

(52) U.S. Cl.
CPC .. *G06T 1/20* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 5,504,859 A | 4/1996 | Gustafson et al. | |
| 6,543,002 B1 | 4/2003 | Kahle et al. | |
| 6,745,321 B1* | 6/2004 | Floyd et al. | 712/227 |
| 7,075,541 B2* | 7/2006 | Diard | 345/505 |
| 7,421,694 B2 | 9/2008 | Gosalia et al. | |
| 7,484,131 B2 | 1/2009 | Fields, Jr. et al. | |
| 7,702,955 B2 | 4/2010 | De Almeida et al. | |
| 8,250,412 B2 | 8/2012 | Cheng et al. | |
| 2006/0179207 A1 | 8/2006 | Eisen et al. | |
| 2012/0056891 A1* | 3/2012 | Chakraborty et al. | 345/502 |
| 2013/0151894 A1 | 6/2013 | Honda et al. | |
| 2014/0325274 A1* | 10/2014 | Mueller | 714/23 |

FOREIGN PATENT DOCUMENTS

WO 2005031575 A2 4/2005

OTHER PUBLICATIONS

International Search Report and Written Opinion from International Application No. PCT/US2015/014114, dated Apr. 30, 2015, 9 pages.

* cited by examiner

*Primary Examiner* — Jacinta M Crawford
(74) *Attorney, Agent, or Firm* — Shumaker & Sieffert, P.A.

(57) ABSTRACT

The techniques described in the disclosure are generally related to gradual, iterative hang recovery for a graphics processing unit (GPU). The techniques described in the disclosure attempt to re-execute instructions of an application in response to a GPU hang, rather than stopping the execution of the application. If the re-execution causes the GPU to hang again, the techniques described in the disclosure cause the GPU to iteratively execute next set of instructions.

21 Claims, 4 Drawing Sheets

DEVICE HANG DETECTION AND RECOVERY

TECHNICAL FIELD

This disclosure relates to hang detection and recovery, and more particularly to hang detection and recovery in input/output (IO) devices.

BACKGROUND

An application executing on an input-output (IO) device may cause the IO device to hang. In a hang state, the IO device becomes unresponsive or the application may not proceed. Such hanging may be due to faulty software or hardware. One example of such an IO device is a graphics processing unit (GPU). Traditionally, the device that includes the GPU appears frozen at least for a few seconds when GPU is hung, which negatively impacts user experience.

SUMMARY

In general, this disclosure is related to techniques for a gradual, iterative approach to graphics processing unit (GPU) hang recovery. In response to a GPU hang, a processor may reset the GPU and cause the GPU to re-execute commands of the application that the GPU was executing at the time of the hang. If the GPU hangs during the re-execution, the processor may reset the GPU and cause the GPU to execute a next set of commands of the application. The next set of commands may be commands in the same frame as the commands the GPU was executing at the time of the hang or commands in the next frame. If the GPU hangs executing the next set of commands, the processor may reset the GPU and cause the GPU to execute subsequent commands of the application. Alternatively, the processor may stop the execution of the application on the GPU.

In this manner, rather than immediately stopping the execution of the application on the GPU in response to a GPU hang, the techniques attempt to gradually recover the GPU, which may enhance user experience because the GPU may not need to restart the execution of the application. There may be various ways in which to determine whether the GPU experienced a hang, and the techniques described in the disclosure for the gradual hang recovery should not be construed limited to any particular way in which hang is detected.

In one example, the disclosure describes a method for hang recovery. The method includes determining a set of instructions of an application a graphics processing unit (GPU) was executing at a time of a GPU hang, resetting the GPU, and instructing the GPU to re-execute the determined set of instructions of the application that the GPU was executing at the time of the GPU hang.

In one example, the disclosure describes an apparatus. The apparatus includes a graphics processing unit (GPU), a memory that stores instructions of an application to be executed by the GPU, and a processor. The processor is configured to determine a set of the instructions of the application the GPU was executing at a time of a GPU hang, reset the GPU, and instruct the GPU to re-execute the determined set of instructions of the application that the GPU was executing at the time of the GPU hang.

In one example, the disclosure describes a computer-readable storage medium having instructions stored thereon that when executed cause one or more processors to determine a set of instructions of an application a graphics processing unit (GPU) was executing at a time of a GPU hang, reset the GPU, and instruct the GPU to re-execute the determined set of instructions of the application that the GPU was executing at the time of the GPU hang.

In one example, the disclosure describes an apparatus. The apparatus includes a graphics processing unit (GPU), a memory that stores instructions of an application to be executed by the GPU, and a processor. The processor comprises means for determining a set of the instructions of the application the GPU was executing at a time of a GPU hang, means for resetting the GPU, and means for instructing the GPU to re-execute the determined set of instructions of the application that the GPU was executing at the time of the GPU hang.

The details of one or more examples are set forth in the accompanying drawings and the description below. Other features, objects, and advantages will be apparent from the description and drawings, and from the claims.

DETAILED DESCRIPTION

Figure 1:
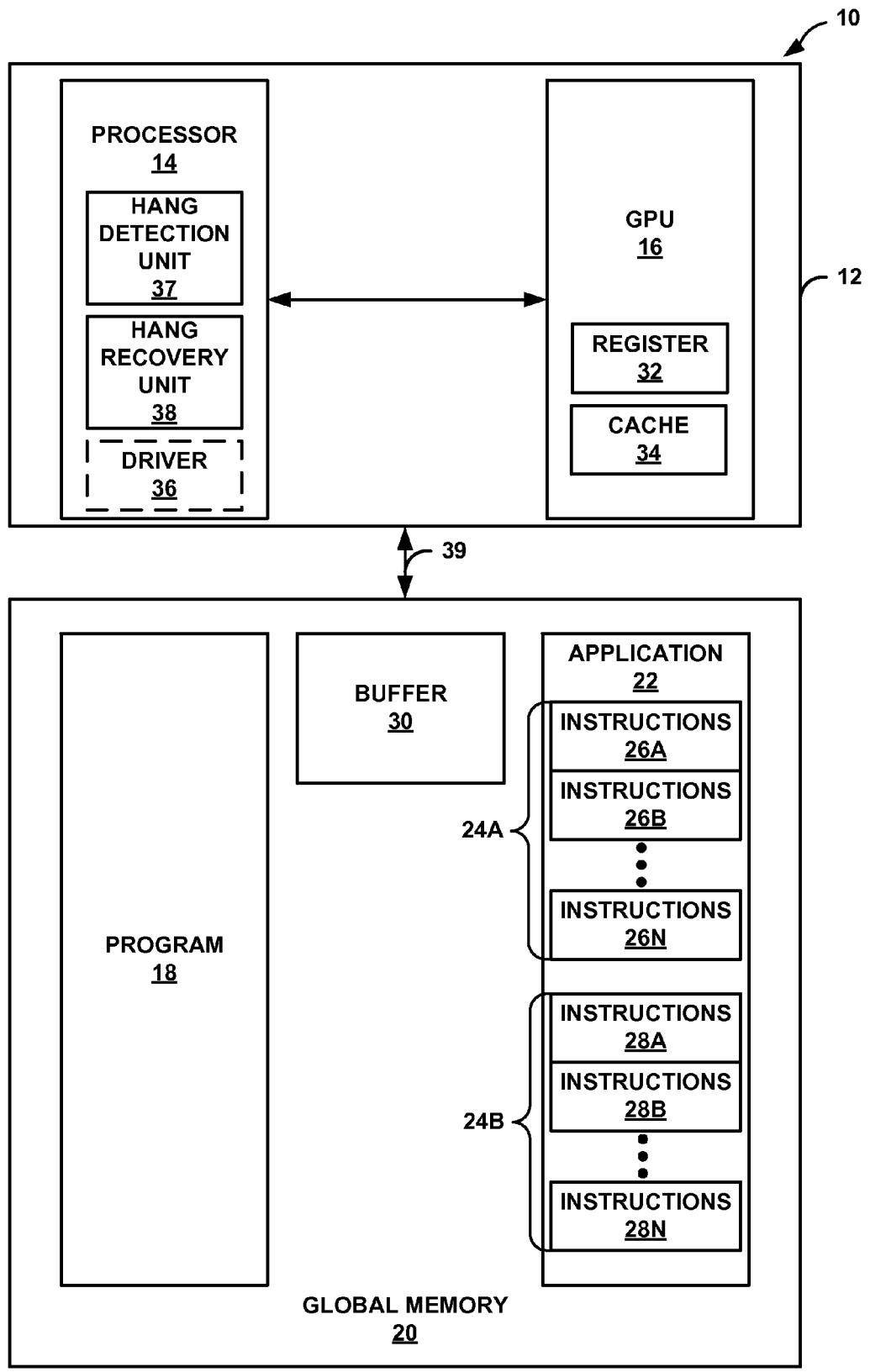
FIG. 1 is a block diagram illustrating an example of a device in accordance with one or more examples described in this disclosure.

This disclosure describes a way in which to recover from a detected hang. A hang state refers to a state where the GPU is non-responsive even though there are functions that are to be performed by the GPU or an application executing on the GPU is not proceeding. For example, a GPU hang may occur due to hardware or software. Hardware of the GPU may become defective over time and not allow the GPU to perform functions even though there are functions to be performed by the GPU. In some cases, software executing on the GPU may cause the GPU hang. For instance, the software may program the wrong GPU state that may result in GPU hang. As another example, a race condition between multiple GPU blocks may cause GPU hang. For instance, GPU hang can be a deadlock between three GPU blocks, where block_A is waiting for block_B to finish, block_B is waiting for block_C to finish, and block_C is waiting for block_A to finish.

In general, a GPU hang refers to the case where some part of the GPU pipeline has stopped processing because of invalid state setup or a hardware bug. This backs up the pipeline stages in-front until the entire GPU is no longer making forward progress, and the GPU is unable to accept new commands. The GPU remains in the hang state until reset. There may be various causes of the GPU hang such as, but not limited to, race condition between two blocks within the GPU, wrong programming by the driver, memory corruption in the input command stream, clock or voltage to GPU is incorrect, and/or external power to GPU is incorrect.

The GPU hang may cause a graphical user interface (GUI) to become non-responsive or cause applications that produce graphics to become non-responsive. For instance, the GUI or the produced graphics may appear frozen when the GPU is in a hang state. Such GPU hanging may negatively impact the user experience. For example, a computing device (e.g., the device that includes the GPU) appears completely "frozen" when GPU hang/fault occurs. The end-user of the computing device typically waits a few seconds and then has to reboot the device to exit the GPU hang state.

A GPU hang should not be confused with a GPU being idle or the GPU switching between applications or contexts (e.g., context switching between contexts in the same application or in different applications). When the GPU is idle, the GPU is waiting for a condition to occur that will eventually occur and may not have work/commands to process. When the GPU is switching between contexts, there may be pause in the execution, but the GPU is responsive and waiting to execute the contexts. In this sense, GPU hang may be considered as a fault state, where the GPU is faulting and functioning in an unintended manner, whereas the GPU being idle or otherwise pausing may be part of the GPU functioning normally. It is when the GPU never exits the idle state or never switches to the next context that the GPU may be considered as being in a hang state.

In the techniques for hang recovery, a processor (e.g., central processing unit (CPU)) determines the set of the commands that the graphics processing unit (GPU) was executing when the GPU entered a hang state. The processor may reset the GPU, and cause the GPU to re-execute the set of commands that the GPU was executing when the GPU entered the hang state. There may be two types of reset: hard reset and soft reset. In hard reset, the processor turns off the power and clock to the GPU and turns the power and clock back on. In the soft reset, the processor returns the GPU to its original state (e.g., clearing out the buffers). In either example, after the reset, the processor causes the GPU to re-execute the set of commands at the time of the GPU hang.

If the GPU is able to execute the set of commands in the second try, the GPU proceeds along having now recovered from the hang. If the GPU hangs again trying to execute the set of commands for the second time, the processor again resets the GPU. After the reset, the processor causes the GPU to execute the next set of commands (i.e., bypasses the set of commands that caused the GPU to hang). If the GPU is able to execute the next set of commands, the GPU proceeds along, having now recovered from the hang.

If the GPU hangs in executing the next set of commands, the processor resets the GPU. After the reset, the processor causes the GPU to execute the next frame, where one frame includes a plurality of sets of commands. If the GPU is able to execute the next frame, the GPU proceeds along having now recovered from the hang. If the GPU hangs executing the next frame, the processor kills the application executing on the GPU.

As another example, rather than executing the next set of commands if the GPU re-hangs, the processor may cause the GPU to execute the first set of commands of the next frame. As yet another example, rather than executing the commands of the next frame if the GPU re-hangs executing the next set of commands, the processor may kill the application executing on the GPU. In this manner, if the GPU hangs after the re-execution of the commands that the GPU was executing when the GPU entered the hang state, the processor may cause the GPU to execute the next set of commands, where the next set of commands may be commands in the same frame as the commands the GPU was executing at the time of the hang or commands in the next frame. If the GPU hangs after the execution of the next set of commands, the processor may kill the application, or, alternatively, cause the GPU to execute a subsequent set of commands. The subsequent set of commands may be commands of the next frame if the next set of commands were commands in the same frame as the commands the GPU was executing at the time of the GPU hang, as one example. It may be possible for the subsequent set of commands to be commands of the same frame. However, if the GPU keeps hanging, at some point the processor may need to kill the application executing on the GPU.

As an illustration, assume that a program executing on the processor generates a first frame, of an application, that includes a first set of commands, a second set of commands, and a third set of commands. Also, assume that the program executing on the processor generates a second frame, of the application, that includes a first set of commands and a second set of commands. For instance, the program may generate commands that are to be executed by the GPU, where one frame includes a plurality of sets of commands, and where the application includes a plurality of frames.

In this example, the GPU may execute the first set of commands of the first frame, and may hang during the execution of the first set of commands of the first frame as detected by the processor. The processor may reset the GPU, and cause the GPU to re-execute the first set of commands of the first frame. If the re-execution is successful, the GPU proceeds along to the second set of commands of the first frame without the processor needing to kill the application.

If the GPU hangs again while executing the first set of commands of the first frame, the processor causes the GPU to reset, bypass the first set of commands of the first frame, and execute the second set of commands of the first frame. If execution is successful, the GPU proceeds to the third set of commands of the first frame without the processor needing to kill the application. If execution of the second set of commands of the first frame is unsuccessful (e.g., the GPU hangs), the processor resets the GPU, bypasses the third set of commands of the first frame, and causes the GPU to execute the first set of commands of the second frame.

If the GPU is able to execute the first set of commands of the second frame, the GPU proceeds to the second set of commands of the second frame without killing the application. If unsuccessful, the processor kills the application. In this manner, it may not be necessary for the processor to stop the execution of an application on the GPU in every instance of a hang. Rather, the processor may cause the GPU to iteratively execute sets of commands of the application in an attempt to recover the GPU, and only when the execution of a plurality of iterations fails does the processor stop the GPU from executing the application.

As described above, the techniques are related to recovering from a GPU hang. The following describes an example manner in which to detect the hang. It should be understood that the hang recovery techniques and the hang detection techniques are independent of one another. For instance, it may be possible to detect hang using a technique other than the one described below, and utilize the hang recovery techniques described above. Also, it may be possible to detect hang using the techniques described in this disclosure and recover from the hang using the techniques described in this disclosure.

The techniques for detecting a GPU hang may occur in the order of milliseconds, rather than seconds. A GPU may be configured with maintaining performance counters. If instructions generated by an application are executing properly by the GPU, the GPU updates one or more of these performance counters regularly (e.g., every few nanoseconds). One or more registers may store the count value for the performance counters.

Examples of the performance counters include, but are not limited to, number of arithmetic logic unit (ALU) Active Cycles, number of L1 instruction cache misses, number of control flow instructions executed, and number of triangles or primitives processed by the rasterizer. The GPU updates the ALU Active Cycles counter (e.g., increments the count by one) after every instance of an ALU function, such as add and multiply. The GPU updates the L1 instruction cache misses counter every instance that an instruction is not available in the cache dedicated to the GPU. The GPU updates the control flow instruction executed counter every instance the GPU executes a conditional instruction (e.g., an if/then instruction). Because instructions executing on the GPU exploit the massive parallelism functionality of the GPU, there is a certain level of confidence that the GPU will update one or more of these example performance counters at least once within a few millisecond cycles. In some examples, the GPU may update at least one of the example counters described above in nano second cycles when the GPU is busy (i.e., not in a hang state).

In some examples, the processor may periodically monitor the values of the performance counters. As one example, the processor may periodically execute a software timer program that reads the values of the performance counters. For example, the processor may execute the software timer program every 10 milliseconds. If the value of none of the performance counters changes from one cycle of the software timer program to the next cycle of the software timer program, the processor may determine that the GPU is in a hang state. In this manner, it may be possible to detect GPU hang within a few milliseconds (e.g., 10 milliseconds).

Also, if there is no bus traffic on the data bus connected to the input and/or output of the GPU, the processor may determine that the GPU is in a hang state. For instance, the processor may monitor the bus interfaces to the GPU via the software timer program or some other program that is continuously executing. If there is no bus traffic for a period of time (e.g., for X microseconds) as determined by monitoring of the bus interfaces, the processor may determine that the GPU is in a hang state.

As additional examples, the processor may monitor the read pointers or timestamps to determine whether the GPU is reading in the next set of instructions or indicating the completion of execution of a set of instructions. If the processor determines that the GPU did not read more instructions (based on movement of the read pointer) and/or did not complete execution of a set of instructions (based on timestamp values) within a certain period of time, the processor may determine that the GPU is in a hang state.

To determine whether the GPU is in a hang state, the processor may only implement techniques for monitoring the performance counters, only implement techniques for monitoring bus traffic, only implement techniques for monitoring read pointers, only implement techniques for monitoring timestamps, or implement any combination of the techniques such as for confirming the GPU hang. Other techniques may be possible to determine whether the GPU is in a hang state, and the techniques described in this should not be considered limited to the specific GPU hang detection techniques.

FIG. 1 is a block diagram illustrating an example of a device in accordance with one or more examples described in this disclosure. For instance, FIG. 1 illustrates device 10. Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 10 may include components in addition to those illustrated in FIG. 1.

As illustrated, device 10 includes integrated circuit (IC) 12 and global memory 20. IC 12 includes processor 14 and graphics processing unit (GPU) 16. GPU 16 is one example of an input-output (IO) device. For ease of description, the techniques are described with respect to GPU 16. However, the techniques are not so limited and may be extended to other IO devices, including (e.g., digital signal processors (DSPs)).

Global memory 20 may be considered as the memory for device 10. Global memory 20 may comprise one or more computer-readable storage media. Examples of global memory 20 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, global memory 20 may include instructions that cause processor 14 and/or GPU 16 to perform the functions ascribed to processor 14 and GPU 16 in this disclosure. Accordingly, global memory 20 may be a computer-readable storage medium having instructions stored thereon that, when executed, cause one or more processors (e.g., processor 14 and GPU 16) to perform various functions.

Global memory 20 may, in some examples, be considered as a non-transitory storage medium. The term "non-transitory" may indicate that the storage medium is not embodied in a carrier wave or a propagated signal. However, the term "non-transitory" should not be interpreted to mean that global memory 20 is non-movable or that its contents are static. As one example, global memory 20 may be removed from device 10, and moved to another device. As another example, a global memory, substantially similar to global memory 20, may be inserted into device 10. In certain examples, a non-transitory storage medium may store data that can, over time, change (e.g., in RAM).

IC 12 includes processor 14 and graphics processing unit (GPU) 16. IC 12 may be any type of integrated circuit that houses or forms processor 14 and GPU 16. For example, IC 12 may be considered as a processing chip within a chip package. Although processor 14 and GPU 16 are illustrated as being part of a single IC 12, aspects of this disclosure are not so limited. In some examples, processor 14 and GPU 16 may be housed in different integrated circuits (i.e., different chip packages).

Examples of processor 14 and GPU 16 include, but are not limited to, a digital signal processor (DSP), general purpose microprocessor, application specific integrated circuit (ASIC), field programmable logic array (FPGA), or other equivalent integrated or discrete logic circuitry. In some examples, GPU 16 may be specialized hardware that includes integrated and/or discrete logic circuitry that provides GPU 16 with massive parallel processing capabilities suitable for graphics processing. In some instances, GPU 16 may also include general purpose processing capabilities, and may be referred to as a general purpose GPU (GPGPU) when implementing general purpose processing tasks (i.e., non-graphics related tasks).

Processor 14, sometimes referred to as a host, may be the central processing unit (CPU) of device 10. Processor 14 may execute various types of programs. Examples of the programs include web browsers, electronic readers, e-mail applications, spreadsheets, video games, video playback, audio playback, word processing, or other programs that generate viewable objects for display, or any other types of programs.

Global memory 20 may store instructions for execution of the one or more programs. For example, as illustrated global memory 20 stores instructions for program 18. Program 18 may be a program that when executed by processor 14 creates graphics that is to be presented on a display of device 10.

In some examples, processor 14 may offload processing tasks to GPU 16, such as tasks that require massive parallel operations. As one example, graphics processing requires massive parallel operations, and processor 14 may offload such graphics processing tasks to GPU 16. In some examples, processor 14 may offload tasks that are unrelated to graphics processing to GPU 16. For instance, matrix operations require parallel operations, and GPU 16 may be better suited to implement such operations as compared to processor 14.

To implement tasks, GPU 16 may be configured to execute one or more applications. For instance, for graphics related processing, GPU 16 may execute applications such as vertex shaders, fragment shaders, and geometry shaders. For non-graphics related processing, GPU 16 may execute applications designed for such processing (e.g., an application for implementing matrix operations or an application for fluid dynamics). For either example (e.g., graphics related processing or non-graphics related processing), processor 14 may instruct GPU 16 to execute the one or more applications.

As illustrated, global memory 20 may store application 22. Application 22 may be a specific application that program 18 calls during the execution of program 18 on processor 14. For instance, a developer may have developed application 22 to exploit the massive parallelism provided by GPU 16. In this way, program 18 does not need to perform the functions of application 22, and can instead cause GPU 16 to perform the functions of application 22.

In this sense, processor 14 may offload tasks which are better implemented using massive parallel processing to GPU 16. For example, during execution, program 18, via processor 14, may instruct GPU 16 to execute application 22. In response, GPU 16 may retrieve instructions of application 22 from global memory 20 and execute the retrieved instructions.

Processor 14 may communicate with GPU 16 (e.g., for purposes of instructing GPU 16) in accordance with a particular application processing interface (API). For example, processor 14 may transmit instructions to GPU 16 such as instructions that instruct GPU 16 to execute application 22 utilizing the API. Examples of such APIs include the DirectX® API by Microsoft®, the OpenGL® by the Khronos group, and the OpenCL™; however, aspects of this disclosure are not limited to the DirectX, the OpenGL, or the OpenCL APIs, and may be extended to other types of APIs that have been developed, are currently being developed, or are to be developed in the future. Moreover, the techniques described in this disclosure are not required to function in accordance with an API, and processor 14 and GPU 16 may utilize any technique for communication.

In some examples, the execution of application 22 may cause GPU 16 to hang. GPU 16 hanging, also referred to as entering a hang state, may mean that GPU 16 is non-responsive even though there are instructions that are to be executed, may mean that GPU 16 is not progressing to the next set of instructions, may mean that GPU 16 is stuck in an infinite loop, or in a deadlock. As described above, GPU hanging should not be confused with GPU 16 idling or context switching. For instance, GPU hanging may be considered as GPU 16 faulting (functioning in an intended manner), whereas idling or context switching, or other such types of GPU 16 functions, may cause GPU 16 to pause execution, but GPU 16 is still functioning in the intended manner.

GPU hanging may negatively impact user experience. For example, application 22 may be an application used to control the graphical user interface (GUI) of device 10. If GPU 16 hangs during the execution of application 22, the GUI may become non-responsive causing user frustration. As another example, program 18 may be a video game, and application 22 may be an application that processes and outputs the graphics generated by the video game. If GPU 16 hangs during execution of application 22, the user may not be able to play the video game, which can also be frustrating.

Accordingly, techniques that recover GPU 16 from the hang state may enhance user experience and allow for proper device 10 usage. As described in more detail, the techniques described in this disclosure provide for a gradual, iterative recovery of GPU 16 from the hang state, and potentially without compromising the user experience. For instance, other techniques may immediately stop the execution of application 22 after GPU 16 hangs during the execution of application 22. However, while such techniques recover GPU 16 from the hang state, such techniques may require the user to restart the execution of application 22 and/or program 18, which still negatively impacts user experience.

As illustrated, processor 14 includes hang detection unit 37 and hang recovery unit 38. Hang detection unit 37 may be configured to detect GPU 16 hang in accordance with techniques described in this disclosure or utilizing other techniques. Hang recovery unit 38 may be configured to recover GPU 16 from the hang state in response to hang detection unit 37 detecting that GPU 16 is in a hang state.

Hang detection unit 37 and hang recovery unit 38 are illustrated as functional blocks to ease with understanding. In some examples, hang detection unit 37 and hang recovery unit 38 may be combined into the same, common unit. In some examples, hang detection unit 37 and/or hang recovery unit 38 may be hardware units of processor 14. In some examples, hang detection unit 37 and/or hang recovery unit 38 may be software or firmware units executing on processor 14.

Moreover, the functions implemented by hang detection unit 37 and hang recovery unit 38 are provided for ease of understanding. In general, processor 14 may be configured to implement the techniques described in this disclosure, and may implement the techniques via hang detection unit 37 and hang recovery unit 38. However, processor 14 may not be limited to implementing the techniques described in this disclosure via hang detection unit 37 and hang recovery unit 38.

In accordance with the techniques described in this disclosure for hang recovery, processor 14, via hang recovery unit 38, may cause GPU 16 to re-execute (e.g., replay) instructions GPU 16 was executing at the time of GPU hang. If the re-execution is unsuccessful, the processor 14, via hang recovery unit 38, may cause GPU 16 to execute the next set of instructions, after a reset of GPU 16, to recover GPU 16. In this case, if GPU 16 recovers, there may be minimal negative impact on the user experience. For instance, because GPU 16 skipped the execution of some instructions (i.e., the instructions that GPU 16 was executing at the time of the hang), there may be some corruption in the graphics data outputted by GPU 16. However, such corruption may be minimal and may even be unnoticeable to the user, especially when compared to requiring the user to restart program 18 and/or application 22.

In some examples, if successive execution of subsequent instructions of application 22 still causes GPU 16 to hang, processor 14, via hang recovery unit 38, may cause GPU 16 to stop the execution of application 22 to recover GPU 16 from the hang. Although the stopping of the execution of application 22 may be needed in certain cases, the techniques first attempt to recover GPU 16 without stopping the execution of application 22, and only stop the execution of application 22 if GPU 16 cannot otherwise be recovered from the hang.

There may be many causes for GPU 16 hanging, including both hardware and software causes. As one example, overtime the hardware of GPU 16 may malfunction or function in a sub-optimal manner. For instance, during testing, GPU 16 may be caused to execute for long time, in what is referred to as long hour device stability runs or "monkey runs." During the stability testing, GPU 16 may spuriously malfunction. Diagnosing the cause the malfunction and correcting for the malfunction may be difficult due to the spurious nature of the malfunction and because the malfunction only becomes evident after a long time. Moreover, even if GPU 16 experiences this malfunction after a long time, it may be possible that GPU 16 self-corrects the malfunction in the next execution. In any event, such malfunction may cause GPU 16 to hang during operation, and recovering GPU 16 from the hang may be desirable.

There may be various software causes for GPU 16 to hang. As one example, for certain cases, it may be possible that contexts of application 22 remain idle waiting for an event to occur that never occurs. If GPU 16 experiences one of these cases where threads remain perpetually idle, GPU 16 may experience a hang. It should be understood that contexts remaining perpetually idle is a fault condition, separate from the idling of contexts, where the event that causes the contexts to execute occurs. As another example, for certain cases, it may be possible that instructions of application 22 cause application 22 to remain in an infinite loop or a deadlock, causing GPU 16 to hang. As yet another example, the instructions of application 22 may cause GPU 16 to attempt to access memory that is unavailable to GPU 16 or non-existent. In such cases, GPU 16 may hang because the data from the memory access is unavailable. As yet another example, a race condition between two GPU blocks (e.g., two GPU blocks attempting to access the same memory at the same). There may be other causes for GPU 16 to hang and the techniques described in this disclosure are not limited to any particular cause of GPU hang.

As described above, in general, GPU 16 hangs when some part of the pipeline (graphics or non-graphics pipeline) fails to function properly. The cause of the failure may be hardware (malfunction) or software (wrong programming of GPU state, race condition, incorrect memory access, etc.), or external causes (e.g., clock or voltage to GPU 16 is incorrect, there is corruption in the input command stream, the external power to the GPU is incorrect etc.). This failure in the pipeline causes later stages of the pipeline to not receive data or receive incorrect/invalid data until GPU 16 makes no forward progress and is unable to receive new commands.

To allow processor 14 to communicate with GPU 16, processor 14 may execute driver 36. Driver 36 is illustrated in dashed lines in FIG. 1 to indicate that driver 36 is software or firmware executing on processor 14. In some examples, driver 36 may be formed as hardware within processor 14, or as a combination of hardware and software/firmware. For ease of description, the techniques are described with examples where driver 36 is software or firmware executing on processor 14.

As described above, processor 14 may cause GPU 16 to execute application 22. In some examples, processor 14, via driver 36, may instruct GPU 16 to execute application 22 and instruct GPU 16 where to retrieve the instructions from in global memory 30. As illustrated in FIG. 1, application 22 includes a plurality of frames 24A and 24B (collectively referred to as "frames 24"), although application 22 may include more than two frames 24. A "frame" of application 22 refers to a logical grouping of instructions. For example, the logical grouping of the instructions may be based on the context of the instructions (e.g., type of instructions, data the instructions are to operate on, data the instructions are to generate, etc.). In general, a frame may be considered to be a set of commands to render an image that is being displayed on a display of device 10. As illustrated, frame 24A includes instructions 26A-26N (collectively referred to as "instructions 26"), and frame 24B includes instructions 28A-28N (collectively referred to as "instructions 28").

Each one of instructions 26 and instructions 28 may be a set of atomic instructions (also referred to as atomic commands). This disclosure uses the terms commands and instructions interchangeably. Atomic instructions refer to a grouping of instructions that are to be executed together. For example, instructions 26A includes a plurality of instructions, and when GPU 16 is executing instructions 26A, GPU 16 should complete the execution of all instructions in instructions 26A before proceeding to another task. Accordingly, all of instructions 26A may be loaded together for execution by GPU 16. Instructions 26 and 28 being atomic instructions are for purposes of illustration and should not be considered limiting.

To cause GPU 16 to execute application 22, processor 14, via driver 36, may form application 22 into a command stream. For example, the operating system (OS) of processor 14 or driver 36 may allocate certain memory portions of global memory 20 for purposes of forming application 22 into the command stream. For instance, as illustrated in FIG. 1, the OS or driver 36 may allocate buffer 30 in global memory 20. Buffer 30 may be referred to as a command buffer or as an indirect buffer (IB).

Processor 14, via driver 36, may load one or more of instructions of frame 24A and frame 24B (e.g., instructions 26 and 28, respectively) into buffer 30 and link the instructions together to form the command stream. As one example, driver 36 may load instructions 26A of frame 24A into the base memory address of buffer 30. Driver 36 may then load instructions 26B of frame 24A into the second memory address of buffer 30, which is identified by the base memory address plus an offset, and so forth until buffer 30 is full. The offset may be indicative of the size of the instructions (e.g., the amount of memory needed to store the instructions).

Processor 14, via driver 36, may then submit the instructions stored in buffer 30 to GPU 16 for eventual execution by GPU 16. For instance, processor 14 may transmit the base memory address of buffer 30 to GPU 16. To execute application 22, GPU 16 may retrieve the instructions of application 22 from buffer 30 based on the base memory address.

For example, GPU 16 may access global memory 20 via system bus 39. In this example, GPU 16 may retrieve instructions 26A of frame 24A from buffer 30 via system bus 39 and store instructions 26A in the local memory of GPU 16 (e.g., cache 34). In some examples, GPU 16 may retrieve multiple instructions 26 of frame 24A in a batch from buffer 30. For instance, GPU 16 may retrieve instructions 26A based on the base memory address into buffer 30 and the size of instructions 26 to retrieve multiple instructions 26. If possible, GPU 16 may also retrieve instructions 28 of frame 24B. In general, the amount of instructions the GPU 16 retrieves may be a function of the size of cache 34, bus bandwidth, and bus timing.

GPU 16 may then execute instructions 26 of frame 24A to execute application 22. During the execution, driver 36 may monitor the memory addresses accessed by GPU 16. For example, driver 36 may monitor which memory addresses were accessed by GPU 16 based on the base memory address in buffer 30 and the size of the instructions (e.g., the offset).

For instance, driver 36 may provide GPU 16 with the base memory address of buffer 30 and a size of instructions (e.g., the offset of address) that GPU 16 is to access. Driver 36 may monitor these values to determine which instructions GPU 16 retrieved for execution.

Driver 36 may also maintain a timestamp indicating a time when GPU 16 executed a particular one of instructions 26 or 28 GPU 16. For instance, driver 36 may maintain a timestamp indicating when GPU 16 began the execution of instructions 26A, instructions 26B, and so forth, including timestamps for instructions 28.

In some examples, the timestamp may also be a unique value after every set of atomic instructions that GPU 16 writes to a memory location in global memory 20 or a local memory shared by processor 14 and GPU 16. In this example, processor 14 may read the timestamp value to determine that the atomic instructions associated with the timestamp have been executed by GPU 16. The timestamp value for each of the atomic instructions may be part of the command stream stored in buffer 30. In this way, GPU 16 may determine which timestamp value to store after executing a particular set of atomic instructions. Driver 36 or processor 14 may determine the timestamp value for each of the atomic instructions.

The monitoring of the accessed memory addresses and the maintaining of the timestamps may be used later for GPU hang recovery. For example, based on the accessed memory addresses and/or the timestamps, processor 14, via hang recovery unit 38, may determine which one of instructions 26 or 28 GPU 16 was executing at the time of the GPU hang.

Furthermore, although driver 36 is described as monitoring the accessed memory addresses and maintaining the timestamps, the techniques described in this disclosure are not so limited. In some examples, other software or firmware executing on processor 14 or a hardware unit of processor 14 may monitor the accessed memory addresses and maintain the timestamps. In other words, processor 14 may be configured to monitor the memory addresses accessed by GPU 16 and maintain timestamps of when instructions are executed to determine which one of the instructions GPU 16 was executing at the time of the GPU hang, and processor 14 may perform such monitoring and maintaining via driver 36 or some other software/firmware or via a hardware unit. Also, the techniques do not require that both the monitoring of the memory addresses and the maintaining of the timestamps, and processor 14 may perform at least one of (or both of) monitoring the memory addresses and maintaining the timestamps.

As described above, during execution of application 22, it may be possible for GPU 16 to hang. When GPU 16 hangs, processor 14, via hang recovery unit 38, may determine which instructions 26 or 28 GPU 16 was executing at the time of the hang (e.g., based on which memory addresses of buffer 30 GPU 16 accessed and/or based on the execution timestamp). Processor 14, via hang recovery unit 38, may then reset GPU 16, and cause GPU 16 to re-execute (i.e., replay) the instructions that GPU 16 was executing at the time of the hang. For example, hang recovery unit 38 may instruct GPU 16 to re-retrieve the instructions that GPU 16 was executing at the time of the hang from buffer 30. Hang recovery unit 38 may be able to determine the memory address of buffer 30, from where GPU 16 is to re-retrieve the instructions, based on the monitored memory access to buffer 30 and the execution timestamp of when instructions are being executed by GPU 16.

There may be at least two ways in which processor 14 may reset GPU 16: a soft reset and a hard reset. In a hard reset, processor 14 turns off the power and the clock to GPU 16, and then turns back on the power and clock to GPU 16. The turning off the power and clock to GPU 16 causes all locally stored information to be cleared. For example, register 32 of GPU 16 may store state information of GPU 16 and cache 34 may locally store data and instructions. Turning off the power and clock to GPU 16 may clear all state information in register 32 and clear all stored data and instructions in cache 34. When processor 14 turns back on the power and clock to GPU 16, register 32 and cache 34 return to their default states.

In a soft reset, processor 14 keeps on the power and clock to GPU 16. However, processor 14 instructs GPU 16 to clear out register 32 and cache 34 and return register 32 and cache 34 to their respective default states (e.g., a soft reset would put the GPU logics and registers to the default state of pop-up). In general, there may be some delay before GPU 16 is fully functional after a hard reset. Accordingly, the example techniques are described with respect to a soft reset. However, the techniques may be implemented with a hard reset as well, such as for examples of GPU 16 that are not capable of clearing out registers and local memory.

Because cache 34 and register 32 are cleared after the reset, processor 14 may need to instruct GPU 16 regarding the instructions that GPU 16 is to execute (e.g., the location in buffer 30 from where GPU 16 is to retrieve the instructions). For example, processor 14, via hang recovery unit 38, may find the command stream or indirect buffer (IB) submission that GPU 16 was executing at the time of the hang (i.e., the instruction in buffer 30 that GPU 16 was executing at the time of the hang).

In accordance with the techniques described in this disclosure, after GPU 16 hangs, processor 14, via hang recovery unit 38 and driver 36, may instruct GPU 16 to re-execute the instructions GPU 16 was executing at the time of the GPU hang starting from the preamble stream (i.e., the beginning of the instructions). As described above, instructions 26 and 28 may be functionally atomic instructions, and it may be possible that GPU 16 hung in the middle of one of instructions 26 or 28. However, because instructions 26 and 28 are atomic instructions, GPU 16 may not be able to begin the execution of one of instructions 26 and 28 in the middle, and may need to execute instructions 26 or 28 from the beginning (e.g., starting from the preamble of the stream). As an example, if GPU 16 hung during the execution of instructions 26A, GPU 16 may not be able to begin the execution of instructions 26A in the middle, and may need to re-execute all instructions of instructions 26A (e.g., starting from the preamble of instructions 26A).

For example, after GPU 16 reset, processor 14, via hang recovery unit 38 and driver 36, may resubmit the IB submission at the time of the hang. If GPU 16 is able to re-execute the instructions that GPU 16 was executing at the time of the hang, GPU 16 may be considered as having recovered from the hang, and may proceed to the next instructions.

In this case, GPU 16 may recover from the hang without any rendering corruption (e.g., replay success). For instance, although the instructions did not execute in the first attempt due to the hang, the instructions did execute in the second attempt, and there would be no effect on the graphics data rendered by GPU 16. There may be a very short delay in the graphics rendering due to the re-execution, but such a delay may not be perceivable.

If, however, during the re-execution GPU 16 hangs again, processor 14 may reset GPU 16 and, via hang recovery unit 38 and driver 36, instruct GPU 16 to execute a next set of instructions. The next set of instructions may be instructions in the same frame or instructions in the next frame. For example, assume that processor 14 determined that GPU 16 hung during the execution of instructions 26B of frame 24A (e.g., based on the monitoring of the memory access and/or execution timestamp). In this example, after a reset, processor 14 may cause GPU 16 to re-execute instructions 26B starting from the beginning of instructions 26B. In one example, if GPU 16 hangs during the re-execution of instructions 26B, processor 14 may instruct GPU 16 to skip the execution of instructions 26B and execute the next set of instructions in the same frame as the instructions GPU 16 was executing at the time of the hang (e.g., instructions 26C of frame 24A). In another example, if GPU 16 hangs during the re-execution of instructions 26B, processor 14 may instruct GPU 16 to skip the execution of instructions 26B and execution of all remaining instructions 26 in frame 24A and execute the set of instructions in the next frame (e.g., instructions 28A of frame 24B).

If the execution of the next set of instructions is successful, GPU 16 may be considered as having recovered from the hang. In examples, where the next instructions are instructions of the same frame as the instructions GPU 16 was executing at hang and execution of the next instructions is successful, GPU 16 may be considered as having recovered from the hang with skip IB success. In examples, where the next instructions are instructions of the next frame and execution of the next instructions is successful, GPU 16 may be considered as having recovered from the hang with skip frame success. In examples where GPU 16 skips instructions of the current frame and executes instructions of the next frame, GPU 16 may be considered as skipping all the IB submissions of the context until the end of the frame.

However, in this case, there may be rendering corruption because GPU 16 skipped the execution of a set of instructions (e.g., GPU 16 skipped the execution of instructions 26B). For example, if executing all instructions results in ideal rendering, then the skipping of instructions results in less than ideal rendering and may appear as graphics corruption. In the example where the next instructions are in the same frame, the amount of rendering corruption may be less than the example where the next instructions are in the next frame. In either case, the rendering corruption may be minimal. Even if the rendering corruption is noticeable, the negative user experience of such rendering corruption may be minimal compared to the negative user experience of having to stop and restart the execution of program 18 and/or application 22.

If the execution of the next instructions is unsuccessful (i.e., GPU 16 hangs again), then processor 14 may reset GPU 16 and, via hang recovery unit 38 and driver 36, cause GPU 16 to execute subsequent instructions or stop the execution of application 22 on GPU 16. When processor 14 causes GPU 16 to stop the execution of application 22, GPU 16 may be considered as skipping all IB submissions. In some examples, processor 14 may mark the context (e.g., the frames of application 22) as bad as part of the stopping of the execution of application 22. In this way, processor 14 may determine that application 22 is potentially faulty. However, it may still be possible that a hardware bug caused GPU 16 to hang, which means that application 22 may not necessarily be faulty even though GPU 16 hung during the execution of application 22.

In some examples, if the next instructions are instructions in the same frame as the instructions GPU 16 was executing at the time of the hang, and GPU 16 hangs during the execution of the next instructions, processor 14 may reset GPU 16 and, via hang recovery unit 38 and driver 36, cause GPU 16 to execute instructions from the next frame or may stop the execution of application 22 on GPU 16. If the next instructions are instructions in the next frame, and GPU 16 hangs during the execution of the next instructions, processor 14, via hang recovery unit 38, may stop the execution of application 22 on GPU 16 or cause GPU 16 to execute subsequent instructions such as those of the following frame.

In this manner, processor 14 may attempt to recover GPU 16 from a hang in the following manner. Processor 14 may attempt to recover GPU 16 from the hang without any rendering corruption (e.g., by re-executing a first set of instructions and attempting replay success). If the attempt is unsuccessful, due to GPU 16 hanging during the re-execution of the first set of instructions, processor 14 may attempt to recover GPU 16 by skipping the first set of instructions and executing a second set of instructions.

In one example, the second set of instructions may be from the same frame as the first set of instructions. In this example, successful execution of the second set of instructions may result in GPU 16 recovery with very minimal rendering corruption (e.g., skip IB success). In another example, the second set of instructions may be from the next frame as the frame that includes the first set of instructions. In this example, successful execution of the second set of instructions may result in GPU 16 recovery with some, but relatively minimal rendering corruption (e.g., skip frame success).

If the recovery attempt by executing the second set of instructions is unsuccessful, due to GPU 16 hanging during the execution of the second set of instructions, processor 14 may attempt to recover GPU 16 by skipping the second set of instructions and causing GPU 16 to execute a third set of instructions such as instructions of a following frame or next instructions in the same frame as the second set of instructions. Alternatively, processor 14 may stop the execution of application 22 on GPU 16 to recover GPU 16 from the hang.

The techniques described in this disclosure may provide one or more advantages. As one example, the techniques may reduce the amount of time a graphical output "freezes." In some examples, due to GPU 16 hanging, the graphical output may appear static (e.g., the GUI may be non-responsive). With the GPU hang recovery techniques described in this disclosure, the GPU hang recovery may be fast enough that graphical output never appears frozen to the user.

As another example, GPU 16 may hang due to hardware causes that are not realized until GPU 16 is operating for a long period of time as determined by long hour stability runs or "monkey runs." For such causes of GPU hang, it may be not be practical to develop software fixes that ensures that the GPU will not hang because the GPU hang is spurious and the cause may be known. In other words, some hardware issues on the GPU may be "unfixable." Also, in examples where device 10 is a mobile device, the delivery of software to fix the GPU from hanging may be limited. For such "unfixable" problems in GPUs, the techniques may be able to recover the GPUs from hanging in a manner that minimizes negative user experience.

Accordingly, the techniques described in this disclosure provide for a gradual, iterative recovery algorithm. The recovery algorithm attempts to recover GPU 16 from the hang with no loss or minimal loss of quality (e.g., no rendering or minimal rendering corruption). If an initial attempt of GPU hang recovery is unsuccessful, the recovery algorithm steps down to the next instructions for execution, and stops the execution of application 22 if a plurality of attempts of GPU hang recovery are unsuccessful. However, it may be possible that processor 14 stops the execution of application 22 after the first attempt of GPU hang recovery (e.g., stops the execution of application 22 if the re-execution of the instructions is unsuccessful).

Figure 2:
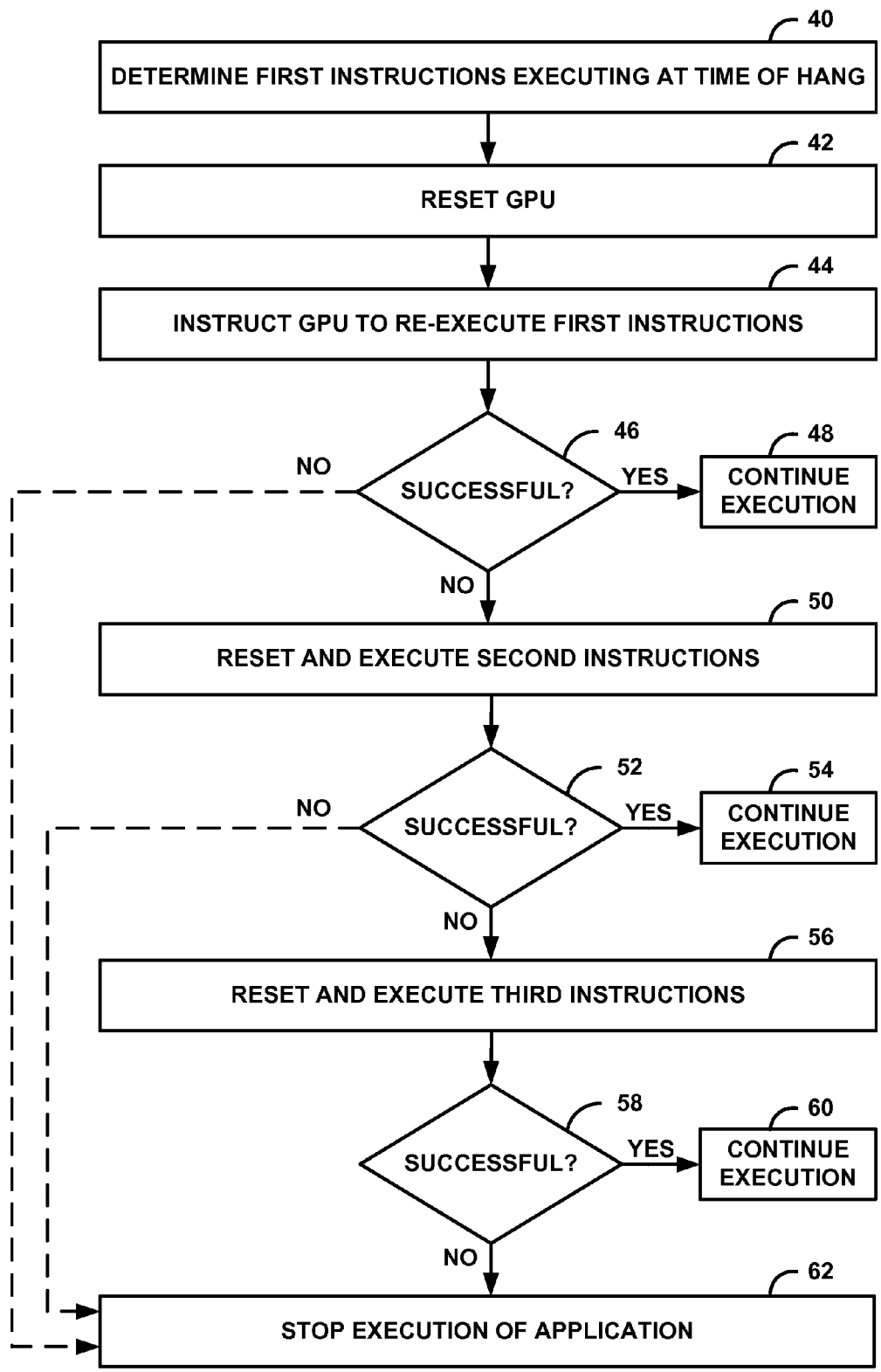
FIG. 2 is a flowchart illustrating an example technique in accordance with one or more examples described in this disclosure.

FIG. 2 is a flowchart illustrating an example technique in accordance with one or more examples described in this disclosure. As illustrated, processor 14, via hang recovery unit 38, may determine a set of instructions (e.g., first instructions) of application 22 that GPU 16 was executing at a time of GPU hang (40). For instance, processor 14, via a driver 36, may monitor the memory accesses by GPU 16 and/or maintain an execution timestamp of the instructions by GPU 16 to determine the set of instructions of application 22 GPU 16 was executing at the time of GPU hang.

Processor 14 may reset GPU 16 (42). As one example, processor 14 may hard reset GPU 16 (e.g., turn off and then turn back on clock and power to GPU 16). As another example, processor 14 may soft reset GPU 16 (e.g., clear register 32 and cache 34, while maintaining the power and clock to GPU 16).

Processor 14, via hang recovery unit 38 and driver 36, may instruct GPU 16 to re-execute the set of instruction of application 22 that GPU 16 was executing at the time of the GPU hang (44). For instance, processor 14 may resubmit instructions from buffer 30 to GPU 16. Processor 14, via hang detection unit 37, may determine whether re-execution of the first set of instructions of application 22 was successful (46). The functions of hang detection unit 37 are described in more detail below with respect to FIG. 3. Processor 14, via hang detection unit 37, may determine whether GPU 16 hung during the re-execution of the first set of instructions of application 22. If the re-execution was successful (YES of 46), then GPU 16 may continue execution with no rendering corruption (48).

If re-execution was unsuccessful (NO of 46), then in one example, processor 14 may reset GPU 16 and, via hang recovery unit 38 and driver 36, instruct GPU 16 to execute a second set of instructions (50). In an alternative example, if re-execution was unsuccessful (NO of 46), then processor 14, via hang recovery unit 38 and driver 36, may stop the execution of application 22 on GPU 16 (62). For example, if GPU 16 hung during the re-execution, processor 14 may reset GPU 16 and, via hang recovery unit 38 and driver 36, instruct GPU 16 to execute a second set of instructions of application 22 or may stop the execution of application 22 on GPU 16. In some examples, a same frame of application 22 includes both the first set of instructions of application 22 and the second set of instructions of application 22. In some examples, a first frame of application 22 includes the first set of instructions of application 22, and a second, different frame of application 22 includes the second set of instructions of application 22.

Processor 14, via hang detection unit 37, may determine whether execution of the second set of instructions was successful (52). For example, processor 14, via hang detection unit 37, may determine whether GPU 16 hung during the execution of the second set of instructions of application 22. If the execution of the second set of instructions is successful (YES of 52), GPU 16 may continue execution of application 22 (54). If the same frame includes both the first set of instructions and the second set of instructions, then GPU 16 may continue the execution of application 22 with minimal corruption due to the skipping of the execution of the first set of instructions. If a first frame includes the first set of instructions, and a second different frame includes the second set of instructions, the GPU 16 may continue execution of application 22 with one frame of rendering corruption due to the skipping of all remaining instructions in the first frame of application 22.

If execution of the second set of instructions was unsuccessful (NO of 52), then in one example, processor 14 may reset GPU 16 and, via hang recovery unit 38 and driver 36, instruct GPU 16 to execute a third set of instructions (56). In an alternative example, if execution of the second set of instructions was unsuccessful (NO of 52), then processor 14, via hang recovery unit 38 and driver 36, may stop the execution of application 22 on GPU 16 (62). For example, if GPU 16 hung during the execution of the second set of instructions and the same frame includes both the first set of instructions and the second set of instructions, processor 14 may reset GPU 16 and, via hang recovery unit 38 and driver 36, instruct GPU 16 to execute a third set of instructions of application 22, where the third set of instructions are in a different frame than the frame that includes the first set of instructions and the second set of instructions. As another example, if GPU 16 hung during the execution of the second set of instructions and different frames include the first set of instructions and the second set of instructions, processor 14, via hang recovery unit 38 and driver 36, may stop the execution of application 22 on GPU 16.

Processor 14, via hang detection unit 37, may determine whether execution of the third set of instructions was successful (58). For example, processor 14 may determine whether GPU 16 hung during the execution of the third set of instructions of application 22. If the execution of the third set of instructions is successful (YES of 58), GPU 16 may continue execution of application 22 (60). In this example, the GPU 16 may continue execution of application 22 with one frame of rendering corruption. If the execution of the third set of instructions is unsuccessful (e.g., GPU 16 hung) (NO of 58), processor 14 may stop the execution of application 22 on GPU 16 (62).

In one of execution possibilities, illustrated in FIG. 2, GPU 16 attempts to execute up to three sets of instructions before processor 14 stops the execution of application 22. However, the techniques described in this disclosure are not so limited. As described, and illustrated in FIG. 2 with dashed lines, in some examples, GPU 16 may attempt to re-execute the first instructions or attempt to execute up to two instructions before processor 14 stops the execution of application 22. In some examples, GPU 16 may attempt to execute more than three instructions, with subsequent instructions coming from the same frame or subsequent frames or some combination of the two, before processor 14 stops the execution of application 22.

The above techniques describe a manner in which GPU 16 may recover from a hang. Processor 14 may implement the above example techniques for hang recovery in response to processor 14 detecting that GPU 16 hung. There may be various ways in which processor 14 may detect whether GPU 16 is hanging or not, and the following provides one example technique of processor 14, via hang detection unit 37, detecting whether GPU 16 is in a hang state. Processor 14, via hang detection unit 37, need not necessarily implement the following hang detection techniques to implement the hang recovery techniques described above in every example, and may utilize any hang detection technique and recover from the hang using the above hang recovery techniques.

In some examples, it may take processor 14 a few seconds to detect reliably whether GPU 16 hung. To detect GPU hang in the order of a few seconds may negatively impact user experience because device 10 may appear frozen during that time before processor 14 can implement any recovery technique. The following techniques may reliably detect GPU hang in the order of a few milliseconds, instead of seconds.

GPU 16 may be predesigned to maintain performance counters, and the techniques utilize one or more of these performance counters for hang detection, which can reduce hang detection from a few seconds to less than or equal to 10 milliseconds. For instance, in some other techniques, a driver (unlike driver 36) executing on processor 14 monitors only buffer 30 and register 32 of GPU 16 for purposes of hang detection. In these other techniques, the driver may determine, every few seconds, whether GPU 16 is executing instructions. As one example, the driver in these other techniques may determine whether GPU 16 is executing instructions every two seconds. The frequency at which the driver determined whether GPU 16 was executing commands may be based on the granularity of buffers that store instructions (e.g., buffer 30 or other buffers sometimes referred to as IB2 command stream buffers), in these other techniques. These other buffers referred to as IB2 command stream buffers may be a second level of commands/instructions in a command stream.

With the techniques described in this disclosure, processor 14, via hang detection unit 37 and driver 36, may monitor the values of the performance counters, and if the value of the performance counters change between the times processor 14 monitored the performance counters, processor 14, via hang detection unit 37, may determine that GPU 16 did not hang. If, however, the values of the performance counters do not change between the times processor 14 monitored the performance counters, processor 14, via hang detection unit 37, may determine that GPU 16 is hanging.

For instance, there may be some types of performance counters for which there is a high level of certainty that GPU 16 will update these counters if GPU 16 is not hanging. In particular, there is a high level of certainty that GPU 16 will update these counters in the order of milliseconds. Examples of these performance counters include number of arithmetic logic unit (ALU) active cycles, number of L1 instruction cache misses, number of control flow instructions executed, and number of triangles or primitives processed by the rasterizer. However, there may be other examples of performance counters as well. GPU 16 may store these performance counters in register 32.

Processor 14, via hang detection unit 37 and driver 36, may monitor these performance counters to detect GPU hang. For example, driver 36 may be configured to monitor one or more of these performance counters every few milliseconds. For example, driver 36 may execute a subroutine every few milliseconds that determines the values of one or more of the performance counters. Hang detection unit 37 or driver 36 may compare the current value of one or more of these performance counters with the last monitored value of one or more of these performance counters. If the values changed, processor 14, via hang detection unit 37, may determine that GPU 16 did not hang, and if none of the values change, processor 14, via hang detection unit 37, may determine that GPU 16 hung. In this manner, worst case scenario for GPU hang detection may be 20 milliseconds, which is much faster hang detection as compared to other techniques that may require up to four seconds for hang detection.

Furthermore, in some examples, processor 14 may determine whether GPU 16 hung without relying on performance counters of GPU 16. Instead, processor 14, via hang detection unit 37 and driver 36, some other program, or some hardware component, may continuously monitor the bus interfaces (e.g., input/output bus interfaces) of GPU 16. If processor 14, via hang detection unit 37, determines that the bus interfaces are inactive for a certain amount of time, processor 14, via hang detection unit 37, may determine that GPU 16 is a hang state. For instance, if the bus interfaces are inactive in the order of a few microseconds, processor 14, via hang detection unit 37, may determine that GPU 16 is in a hang state.

Monitoring the bus interfaces for hang detection may be beneficial in examples where GPU 16 is not configured to maintain or output one or more of the example performance counters described above. In some examples, processor 14, via hang detection unit 37, may monitor both bus interfaces and performance counters for hang detection and/or for confirming hang detection. In some examples, for hang detection, processor 14, via hang detection unit 37, may implement the monitoring of the bus interfaces, but not the performance counters, and in some examples, for hang detection, processor 14, via hang detection unit 37, may implement the monitoring of performance counters, but not the bus interfaces.

As yet another example, processor 14, via hang detection unit 37, may monitor read pointers of GPU 16. If the read pointers do not change within a certain period of time, processor 14, via hang detection unit 37, may determine that GPU 16 is in a hang state. As a further example, processor 14, via hang detection unit 37, may monitor the timestamps, in examples where GPU 16 stores the timestamp values after the execution of atomic instructions. If a new timestamp has not been written within a certain period of time, processor 14, via hang detection unit 37, may determine that GPU 16 is in a hang state. In some examples, if GPU 16 is not hung, an update to the read pointer or the timestamp may occur every few microseconds.

In some examples, in response to determining that GPU 16 hung, processor 14 may implement the example techniques described above for hang recovery, such as the example illustrated in FIG. 2. For example, in response to detecting GPU hang, processor 14 may determine the set of instructions of application 22 that GPU 16 was executing at the time of the GPU hang, cause GPU 16 to re-execute those instructions, and proceed in the manner described above and illustrated in FIG. 2, as one example.

Figure 3:
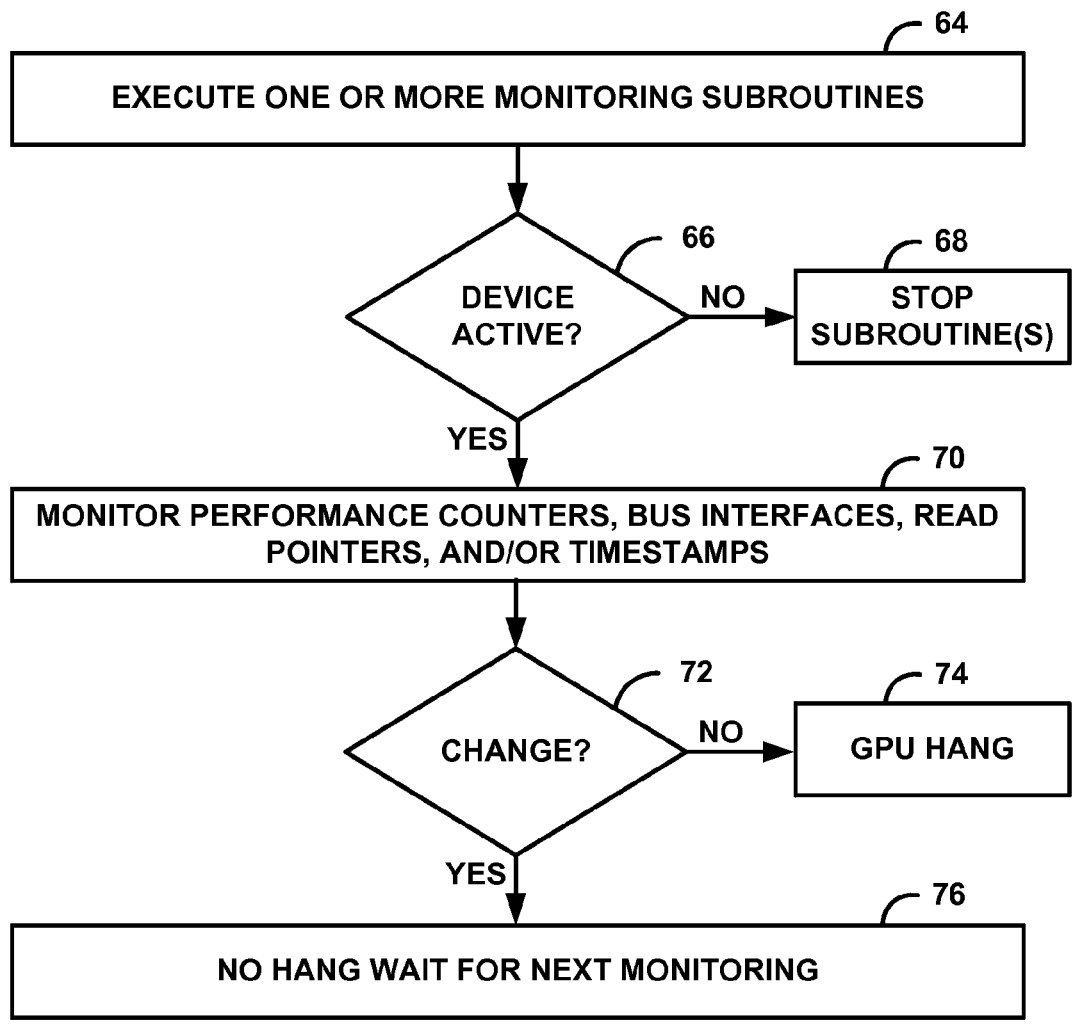
FIG. 3 is a flowchart illustrating another example technique in accordance with one or more examples described in this disclosure.

FIG. 3 is a flowchart illustrating another example technique in accordance with one or more examples described in this disclosure. As illustrated, processor 14, via hang detection unit 37 and driver 36, may execute one or more monitoring subroutines (64). As one example, the subroutine may be a timer subroutine implemented by software threads of driver 36. Driver 36 may execute the monitoring subroutine every few milliseconds (e.g., 10 milliseconds). Driver 36 may execute the monitoring subroutine whenever processor 14 is in an active state or enters an active state (e.g., if processor 14 goes from active to inactive, and then back to active, driver 36 may execute the monitoring subroutine when processor 14 is back to active).

As described above, another example of a monitoring subroutine may be a subroutine that monitors the bus interfaces to GPU 16. In some examples, the subroutine that monitors the bus interfaces to GPU 16 may execute continuously to determine whether there is activity on the bus interfaces to GPU 16.

Additional examples of the monitoring subroutine include one or more subroutines that monitor the read pointers of GPU 16 and monitor the timestamps outputted by GPU 16. Processor 14, via hang detection unit 37 and driver 36, may continuously execute these subroutines or execute these subroutines periodically.

Processor 14 may determine whether GPU 16 is active (66). If GPU 16 is not active (NO of 66), processor 14 may stop the monitoring subroutine(s) (68). If GPU 16 is active (YES of 66), processor 14, via hang detection unit 37, may monitor one or more of the performance counters, bus interfaces, read pointers, and/or timestamps (70). It should be understood that processor 14 need not necessarily monitor all of the following example parameters that are indicative of a hang: performance counters, bus interfaces, read pointers, and timestamps. In some cases, processor 14 may monitor any combination of one or more of these example parameters indicative of a hang, monitor only one of the examples, or monitor other parameters indicative of a GPU hang. In some cases, by monitoring a combination of these example parameters indicative of a hang, processor 14 may be able to confirm the GPU hang.

Processor 14, via hang detection unit 37, may determine whether the counter changed compared to the previous read of the counters, whether there was activity on the bus interfaces, whether the read pointers changed, or whether the timestamps changed (72). If there was no change (NO of 72), processor 14, via hang detection unit 37, may determine that GPU 16 hung and may implement the hang recovery techniques described above (74). If there is change (YES of 72), processor 14, via hang detection unit 37, may determine that there is no GPU hang and wait for the next execution monitoring (76).

Figure 4:
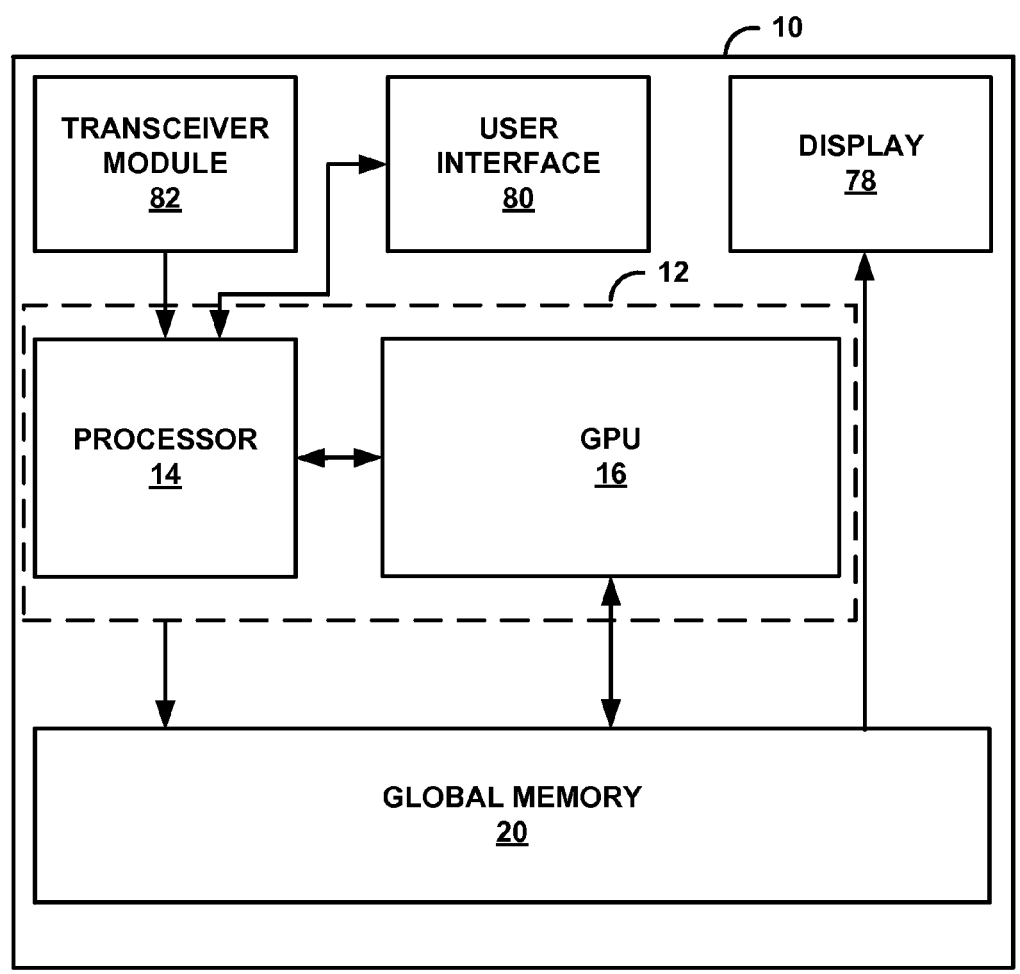
FIG. 4 is a block diagram illustrating a device of FIG. 1 in further detail.

FIG. 4 is a block diagram illustrating a device of FIG. 1 in further detail. For example, FIG. 4 further illustrates device 10. Examples of device 10 include, but are not limited to, wireless devices, mobile telephones, personal digital assistants (PDAs), video gaming consoles that include video displays, mobile video conferencing units, laptop computers, desktop computers, television set-top boxes, tablet computing devices, e-book readers, and the like. Device 10 may include IC 12 that includes processor 14 and GPU 16. Device 10 may also include global memory 20, display 78, user interface 80, and transceiver module 82.

Device 10 may include additional modules or units not shown in FIG. 4 for purposes of clarity. For example, device 10 may include a speaker and a microphone, neither of which are shown in FIG. 4, to effectuate telephonic communications in examples where device 10 is a mobile wireless telephone. Furthermore, the various modules and units shown in device 10 may not be necessary in every example of device 10. For example, user interface 80 and display 78 may be external to device 10 in examples where device 10 is a desktop computer. As another example, user interface 80 may be part of display 78 in examples where display 78 is a touch-sensitive or presence-sensitive display of a mobile device.

Processor 14, GPU 16, and global memory 20 of FIG. 4 may be similar to processor 14, GPU 16, and global memory 20 of FIG. 1. Examples of user interface 80 include, but are not limited to, a trackball, a mouse, a keyboard, and other types of input devices. User interface 80 may also be a touch screen and may be incorporated as a part of display 78. Transceiver module 82 may include circuitry to allow wireless or wired communication between device 10 and another device or a network. Transceiver module 82 may include modulators, demodulators, amplifiers and other such circuitry for wired or wireless communication. Display 78 may comprise a liquid crystal display (LCD), a cathode ray tube (CRT) display, a plasma display, a touch-sensitive display, a presence-sensitive display, or another type of display device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for hang recovery, the method comprising:
   determining a first set of instructions of an application a graphics processing unit (GPU) was executing at a time of a GPU hang;
   resetting the GPU;
   instructing the GPU to re-execute the first set of instructions of the application that the GPU was executing at the time of the GPU hang;

determining that the GPU hung during the re-execution of the first set of instructions of the application; and
in response to the determination that the GPU hung during the re-execution of the first set of instructions:
resetting the GPU; and
instructing the GPU to execute a second set of instructions of the application.

2. The method of claim 1, wherein a same frame of the application includes both the first set of instructions of the application and the second set of instructions of the application.

3. The method of claim 1, wherein a first frame of the application includes the first set of instructions of the application, and wherein a second, different frame of the application includes the second set of instructions of the application.

4. The method of claim 1, wherein a first frame of the application includes both the first set of instructions of the application and the second set of instructions of the application, the method further comprising:
determining whether the GPU hung during the execution of the second set of instructions of the application; and
if the GPU hung during the execution of the second set of instructions of the application:
resetting the GPU; and
instructing the GPU to execute instructions of a second, different frame of the application on the GPU.

5. The method of claim 4, further comprising:
determining whether the GPU hung during the execution of the instructions of the second frame of the application; and
if the GPU hung during the execution of the instructions of the second frame of the application, stopping execution of the application on the GPU.

6. The method of claim 1, wherein a first frame of the application includes the first set of instructions of the application, and wherein a second, different frame of the application includes the second set of instructions of the application, the method further comprising:
determining whether the GPU hung during the execution of the second set of instructions of the application; and
if the GPU hung during the execution of the second set of instructions of the application, stopping the execution of the application on the GPU.

7. The method of claim 1, further comprising:
monitoring one or more of performance counters, bus interfaces, read pointers, or timestamps of the GPU; and
determining whether the GPU hung based on the monitoring,
wherein determining the first set of instructions comprises determining the first set of instructions of the application the GPU was executing at the time of the GPU hang in response to determining that the GPU hung.

8. An apparatus for hang recovery comprising:
a memory that stores instructions of an application to be executed by a graphics processing unit (GPU); and
a processor configured to:
determine a first set of the instructions of the application the GPU was executing at a time of a GPU hang;
reset the GPU;
instruct the GPU to re-execute the first set of the instructions of the application that the GPU was executing at the time of the GPU hang;
determine that the GPU hung during the re-execution of the first set of instructions of the application; and
in response to the determination that the GPU hung during the re-execution of the first set of instructions:
reset the GPU; and
instruct the GPU to execute a second set of instructions of the application.

9. The apparatus of claim 8, wherein a same frame of the application includes both the first set of instructions of the application and the second set of instructions of the application.

10. The apparatus of claim 8, wherein a first frame of the application includes the first set of instructions of the application, and wherein a second, different frame of the application includes the second set of instructions of the application.

11. The apparatus of claim 8, wherein a first frame of the application includes both the first set of instructions of the application and the second set of instructions of the application, and wherein the processor is configured to:
determine whether the GPU hung during the execution of the second set of instructions of the application; and
if the GPU hung during the execution of the second set of instructions of the application:
reset the GPU; and
instruct the GPU to execute instructions of a second, different frame of the application.

12. The apparatus of claim 11, wherein the processor is configured to:
determine whether the GPU hung during the execution of the instructions of the second frame of the application; and
if the GPU hung during the execution of the instructions of the second frame of the application, stop execution of the application on the GPU.

13. The apparatus of claim 8, wherein a first frame of the application includes the first set of instructions of the application, wherein a second, different frame of the application includes the second set of instructions of the application, and wherein the processor is configured to:
determine whether the GPU hung during the execution of the second set of instructions of the application; and
if the GPU hung during the execution of the second set of instructions of the application, stop the execution of the application on the GPU.

14. The apparatus of claim 8, wherein the processor is configured to:
monitor one or more of performance counters, bus interfaces, read pointers, or timestamps of the GPU; and
determine whether the GPU hung based on the monitoring,
wherein the processor is configured to determine the first set of instructions of the application the GPU was executing at the time of the GPU hang in response to determining that the GPU hung.

15. The apparatus of claim 8, wherein the apparatus comprises one of a video device, a set-top box, a wireless handset, a personal digital assistant, a desktop computer, a laptop computer, a gaming console, a video conferencing unit, and a tablet computing device.

16. The apparatus of claim 8, further comprising the GPU.

17. A non-transitory computer-readable storage medium having instructions stored thereon that when executed cause one or more processors to:
determine a first set of instructions of an application a graphics processing unit (GPU) was executing at a time of a GPU hang;
reset the GPU;
instruct the GPU to re-execute the first set of instructions of the application that the GPU was executing at the time of the GPU hang;
determine that the GPU hung during the re-execution of the first set of instructions of the application; and in response to the determination that the GPU hung during the re-execution of the first set of instructions:
    reset the GPU; and
    instruct the GPU to execute a second set of instructions of the application.

18. The non-transitory computer-readable storage medium of claim 17, wherein a first frame of the application includes both the first set of instructions of the application and the second set of instructions of the application, the computer-readable storage medium further comprising instructions that cause the one or more processors to:
    determine whether the GPU hung during the execution of the second set of instructions of the application; and
    if the GPU hung during the execution of the second set of instructions of the application:
        reset the GPU; and
        instruct the GPU to execute instructions of a second, different frame of the application on the GPU.

19. The non-transitory computer-readable storage medium of claim 17, wherein a first frame of the application includes the first set of instructions of the application, and wherein a second, different frame of the application includes the second set of instructions of the application, the computer-readable storage medium further comprising instructions that cause the one or more processors to:
    determine whether the GPU hung during the execution of the second set of instructions of the application; and
    if the GPU hung during the execution of the second set of instructions of the application, stop the execution of the application on the GPU.

20. An apparatus for hang recovery comprising:
    a memory that stores instructions of an application to be executed by a graphics processing unit (GPU); and
    a processor comprising:
        means for determining a first set of the instructions of the application the GPU was executing at a time of a GPU hang;
        means for resetting the GPU;
        means for instructing the GPU to re-execute the first set of instructions of the application that the GPU was executing at the time of the GPU hang;
        means for determining that the GPU hung during the re-execution of the first set of instructions of the application;
        means for resetting the GPU in response to the determination that the GPU hung during the re-execution of the first set of instructions; and
        means for instructing the GPU to execute a second set of instructions of the application after resetting the GPU in response to the determination that the GPU hung during re-execution of the first set of instructions.

21. The apparatus of claim 20, further comprising the GPU.

* * * * *